United States Patent
Bando et al.

(10) Patent No.: US 7,291,299 B2
(45) Date of Patent: Nov. 6, 2007

(54) NANOTUBE, NANO THERMOMETER AND METHOD FOR PRODUCING THE SAME

(75) Inventors: Yoshio Bando, Ibaraki (JP); Yihua Gao, Ibaraki (JP); Tadao Sato, Ibarakai (JP)

(73) Assignee: National Institute for Materials Science, Ibaraki (JP)

( * ) Notice: Subject to any disclaimer, the term of this patent is extended or adjusted under 35 U.S.C. 154(b) by 35 days.

(21) Appl. No.: 11/230,510

(22) Filed: Sep. 21, 2005

(65) Prior Publication Data
US 2006/0013280 A1    Jan. 19, 2006

Related U.S. Application Data

(62) Division of application No. 10/357,452, filed on Feb. 4, 2003, now abandoned.

(30) Foreign Application Priority Data
Feb. 4, 2002    (JP) ............... 2002-067661

(51) Int. Cl.
*B32B 7/00*    (2006.01)
(52) U.S. Cl. ............ 264/81; 977/762; 977/811; 977/833; 977/955
(58) Field of Classification Search ............... None
See application file for complete search history.

(56) References Cited

U.S. PATENT DOCUMENTS

| | | |
|---|---|---|
| 1,793,303 A | 2/1931 | Boyer |
| 5,457,343 A | 10/1995 | Ajayan et al. |
| 6,153,299 A | 11/2000 | Smith et al. |
| 2001/0051367 A1 | 12/2001 | Kiang |
| 2002/0014182 A1 | 2/2002 | Yadav et al. |
| 2002/0055010 A1 | 5/2002 | Gao et al. |
| 2004/0149209 A1* | 8/2004 | Dai et al. ............ 118/715 |

FOREIGN PATENT DOCUMENTS

JP    2004181397    7/2004

OTHER PUBLICATIONS

Gao et al, "Carbon nanothermometer containing gallium", Nature, vol. 415, No. 6872, p. 599, Feb. 7, 2002.*

* cited by examiner

*Primary Examiner*—Mary Lynn Theisen
(74) *Attorney, Agent, or Firm*—Wenderoth, Lind & Ponack, L.L.P.

(57) ABSTRACT

A novel nano thermometer, which can be used for temperature measurement of a wide temperature range, in a micrometer size environment, and a method for producing the same. The nano thermometer is a carbon nanotube filled with a continuous columnar gallium, which enables measurement of environmental temperature by length change of the columnar gallium, and is produced by mixing $Ga_2O_3$ powder and carbon powder uniformly, and performing heat treatment for this mixed powder at a temperature range of 1200 to 1400° C. under an inert gas flow.

6 Claims, 3 Drawing Sheets

NANOTUBE, NANO THERMOMETER AND METHOD FOR PRODUCING THE SAME

CROSS REFERENCE TO RELATED APPLICATION

This application is a divisional application of Ser. No. 10/357,452, filed Feb. 4, 2003, now abandoned.

FIELD OF THE INVENTION

The present invention relates a nanotube, a nano thermometer and a method for producing the same. More particularly, the present invention relates to a nanotube, and novel nano thermometer using the nanotube, which can be used for temperature measurement of a wide temperature range, in a micrometer size environment, and a method for producing the same.

BACKGROUND OF THE INVENTION

As a result of many researchers' having studied over many years about carbon nanotubes (CNTs) since its discovery in 1991, CNTs found uses in many fields. For example, they can serve as field-effect devices, probe-tips for scanning probe microscope, superconducting material, high-sensitivity microbalances, structural materials, tiny tweezers for nanoscale manipulation, gas detectors and hydrogen energy storage devices etc.

Nowadays, much research has entered the size area of at least micrometer. Therefore, the conventional four kinds of thermometers designed for a macroscopic environment are no longer appropriate for a micrometer-size environment, and a nano thermometer, which can perform temperature measurement of micrometer size environment, is needed.

Moreover, the conventional thermometer had the comparatively narrow temperature range which can be measured, and some thermometers needed to be prepared for every measurement temperature when a wide range temperature was measured.

Therefore, in the present invention, the object is to provide a solution to the above-mentioned problems of the conventional thermometer, and to provide a novel nano thermometer, which enables temperature measurement of a wide temperature range in a micrometer size environment, and a method for producing the same.

SUMMARY OF THE INVENTION

Figure 1:
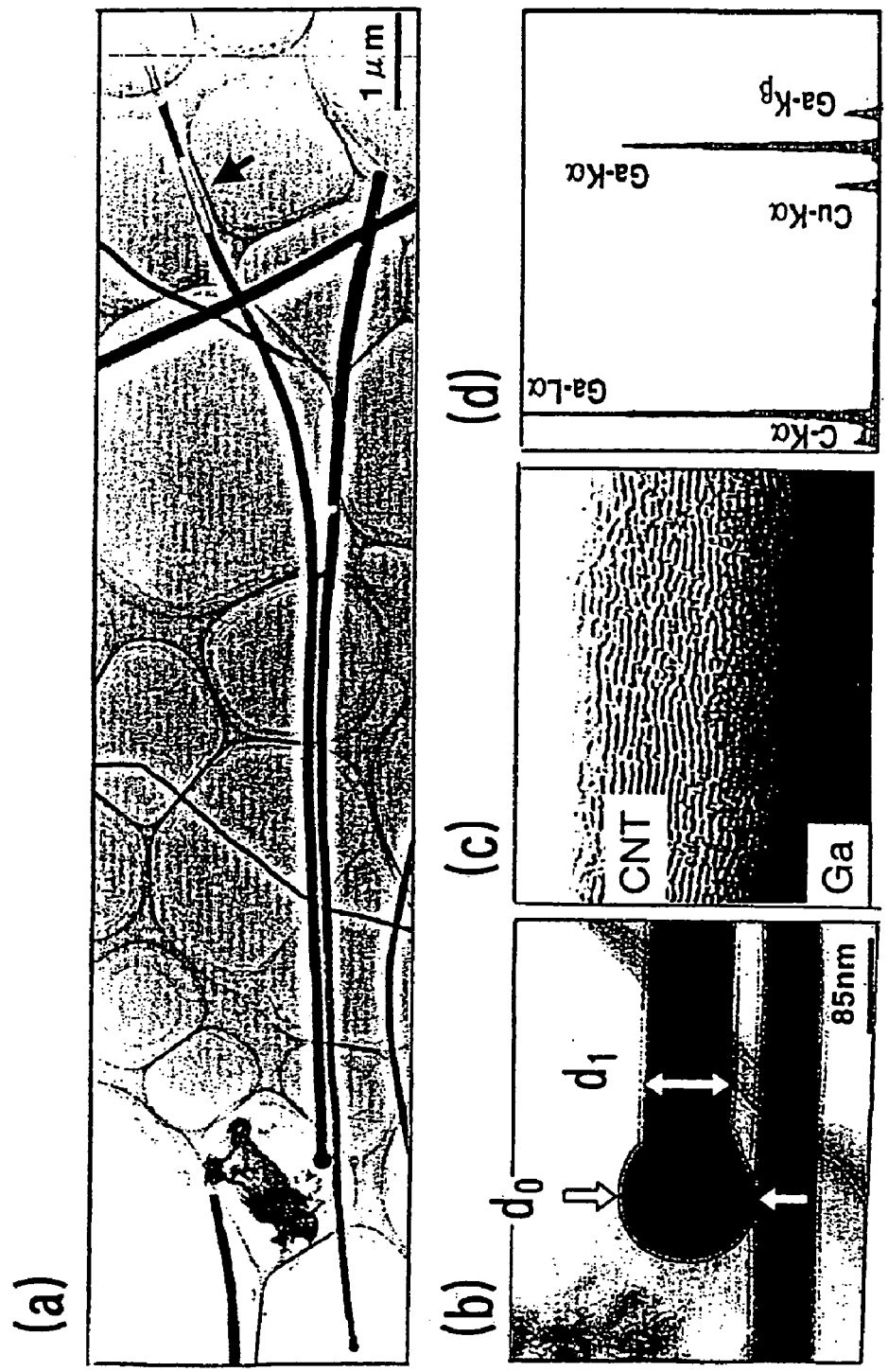
FIG. 1(a) shows the morphology of a wire indicated by the arrow, (b) shows the morphology of the wire wrapped by a thin layer on its round tip and body, (c) shows the HRTEM image of the thin wrapping layer, (d) shows an EDS spectrum from the region in (c).

The present invention firstly provides, as a means to solve the above-mentioned problems, a nano thermometer, comprising a carbon nanotube filled with a continuous columnar gallium, which enables measurement of environmental temperature by length change of the columnar gallium.

Also, the present invention secondly provides a nano thermometer, having length of 1-10 μm and diameters of 40-150 nm. The invention thirdly provides a nano thermometer, which enables measurement of the temperature of the range of at least 50 to 500° C. The present invention fourthly provides a nano thermometer, whose error is within 0.25° C.

And the present invention fifthly provides a nanotube, comprising a carbon nanotube filled with a columnar gallium.

Further, the present invention sixthly provide a method for producing a nano thermometer, said method comprising mixing $Ga_2O_3$ powder and carbon powder uniformly, performing heat treatment for this mixed powder at a temperature of 966° C. or more under an inert gas flow to vaporize, and making a reaction at a temperature of 835° C. or less. The present invention seventhly provides a method for producing a nano thermometer, wherein a weight ratio of $Ga_2O_3$ powder to carbon powder is 7.8:1. The present invention eighthly provides a method for producing a nano thermometer, wherein carbon powder is an amorphous active carbon. The present invention ninthly provides a method for producing a nano thermometer, wherein inert gas is nitrogen gas, and tenthly provides a method for producing a nano thermometer, wherein heat treatment is performed using a vertical radio-frequency furnace. Also, the present invention eleventhly provides a method for producing a nano thermometer, wherein heat treatment is performed for 1 hour or more at a temperature of 1300 to 1400° C.

DETAILED DESCRIPTION OF THE INVENTION

The present inventions provide a nano thermometer which can also be considered as a novel potential application of a carbon nanotube (CNT). That is, the nanotube of the present invention comprises a carbon nanotube filled with a columnar gallium (Ga).

The nano thermometer of the present invention comprising a CNT filled with a continuous columnar Ga, enables measurement of environmental temperature by length change of the columnar Ga. This potential application is based on the expansion characteristic of Ga inside the CNT. In the nano thermometer of the present invention, since the hollow cylinder of CNT is filled with Ga, Ga has the form of a continuous column.

In the present invention, the reason why Ga rather than another metal is chosen as the filling material is that Ga has one of the longest liquid ranges of any metal, i.e. 29.78-2,403° C., and has a low vapor pressure even at high temperatures, which makes it suitable for use in a wide-temperature-range thermometer. Therefore, the nano thermometer of the present invention has a potential wide measuring range due to the wide liquid range of Ga, 29.78 to 2,403° C., which is much wider than that of Hg, −38.87 to 356.58° C.

Surprisingly, in this thermometer, the length of the columnar Ga increases linearly with increasing temperature in the temperature range of 50 to 500° C. Therefore, with the nano thermometer of the present invention, environmental temperature can be measured from the length of Ga simpler and correctly in the temperature range of 50 to 500° C. The present nano thermometer, even more surprisingly, can realize a very highly precise nano thermometer within an error of 0.25° C.

Moreover, since the nano thermometer of the present invention uses the detailed structure of a CNT, the very small thermometer of a micrometer-size is realized. For example, the nano thermometer having length of 1-10 μm and diameters of 40-150 nm is realized. And in the case of this nano thermometer of the present invention, for example, Ga can be made to extend up to about 8 mm in CNT.

The nano thermometer of the present invention can play an important role in various researches involving temperature measurement of a wide temperature range in micrometer environment.

The nano thermometer of the present invention is producible by a method of the present invention as follows. That is, in the method of the present invention, a nano thermometer is manufactured by mixing $Ga_2O_3$ powder and carbon powder uniformly, performing heat treatment for this mixed powder at a temperature of 966° C. or more under an inert gas flow to vaporize, and making a reaction at a temperature of 835° C. or less.

In the method of the present invention, carbon powder can be used as raw material of the CNT part which constitutes a nano thermometer. As carbon powder, carbon powder of comparatively high purity, for example 90% or more of purity, can be used. And it is desirable to be activated carbon and to be amorphous activated carbon more preferably. $Ga_2O_3$ powder can be used as raw material of the columnar Ga filling in the CNT.

In the method of the present invention, a weight ratio of $Ga_2O_3$ powder to carbon powder can be adjusted in the range of about 7:1 to 8:1, and is 7.8:1 more preferably.

$Ga_2O_3$ powder and carbon powder are mixed uniformly, and heat treatment is performed at a temperature of 966° C. or more under an inert gas flow. Although the mixed powder of $Ga_2O_3$ and carbon is vaporizable at a temperature of 966° C. or more, it is more desirable that heat treatment is performed at the temperature range from 1200 to 1400° C. Herein, an inert gas is desirably nitrogen gas. The vapors are carried by the inert gas flow, and they can react at the temperature of 835° C. or less and are deposited. In the method of the present invention, it is simple and is desirable that the heat treatment is performed using a vertical radio-frequency furnace. For example, a vertical radio-frequency furnace can be used in the method of the present invention. If a susceptor of the vertical radio-frequency furnace has one bottom inlet pipe and one top outlet pipe of the inert gas flow, the nano thermometer of the present invention can be obtained on the inner surface of the top outlet pipe as depositions, for example.

In the present invention, heat treatment can be performed at a temperature range from 1200 to 1400° C. as above-mentioned. More specifically, a heat treatment of 1 hour or more at the temperature from 1300 to 1400° C. can be made as a rough standard.

The mode for carrying out the invention is explained in more detail by the following example.

EXAMPLE

The nano thermometer was produced using the vertical radio-frequency furnace as described by the reference; Golberg, G. et al. Large-scale synthesis and HRTEM analysis of single-walled B- and N-doped carbon nanotube bundles. Carbon 38, 2017-2027 (2000). In the open graphite crucible, the reactant was a homogenous mixed powder of $Ga_2O_3$ and pure amorphous active carbon (AAC) in the weight ratio 7.8:1. The graphite susceptor of the vertical radio-frequency furnace had one bottom inlet pipe and one top outlet pipe made of 99.99% purity graphite. Pure $N_2$ gas flow was introduced into the furnace. Heat treatment at 1,360° C. for 2 hours was performed for the reactant. After the heat treatment, the reactant in the graphite crucible disappeared, while some materials were found to have deposited on the inner surface of the top outlet graphite pipe. In the deposition zone, the temperature was measured to be ~800° C.

The deposited materials were collected and analyzed by a 300 kV field emission analytical high-resolution transmission electron microscope (HRTEM, JEM-3000F) equipped with an x-ray energy dispersive spectrometer (EDS). FIG. 1(a) shows several 1-dimensional (1D) nanoscale wires of the deposited materials, which have lengths of 1-10 μm and diameters of 40-150 nm. The bar at the lower right corner corresponds to 1 μm. The wire indicated by the arrow was analyzed carefully. FIG. 1(b) shows that the wire is wrapped by a thin layer on its round tip and body, where $d_1$=75 nm. The HRTEM image in FIG. 1(c) shows that this thin layer is carbon. The d-spacing of the fringes is ~0.34 nm. FIG. 1(d), an EDS spectrum from the region in (c). The horizontal axis is Energy axis, while the vertical is Intensity in arbitrary unit. The peaks of C—$K_α$ (0.28 keV), Ga—$L_α$ (1.10 keV), Ga—$K_α$ (9.24 keV) and Ga—$K_β$ (10.26 keV) are shown, the Cu peak was originated from the Cu TEM grid. That is, it shows that the wire contains Ga and C.

Based on the above analysis, it can be concluded that the indicated wire is a CNT filled with Ga. From the left to the right of the CNT shown in (a), there are round tips, a long columnar Ga, a hollow space beside the arrowhead, a short columnar Ga and another hollow space. In (b), the length and outer diameter $d_0$ of the CNT are 9,180 nm and 85 nm, while the length $L_0$ and diameter $d_1$ of the longer columnar Ga are 7,560 nm and 75 nm, respectively. The round tip keeps its shape and size when the temperature changes.

Figure 2:
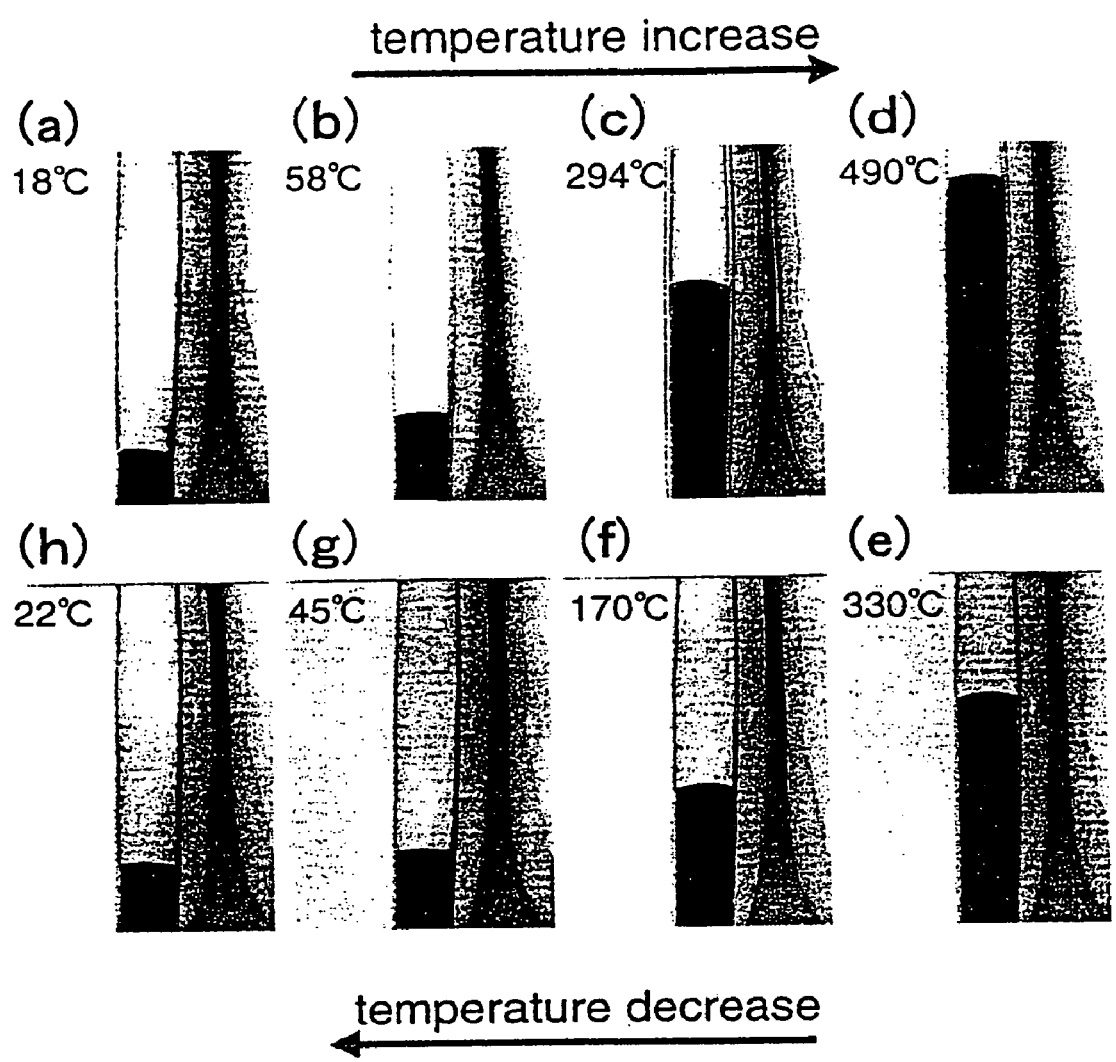
FIG. 2 shows the morphologies of the Ga tip when the temperature increases from 18° C. (a), via 58° C. (b) and 294° C. (c), to 490° C. (d), as well as the morphologies when the temperature decreases from 490° C. (d), via 330° C. (e), 170° C. (f) and 45° C. (g), to 22° C. (h).
Figure 3:
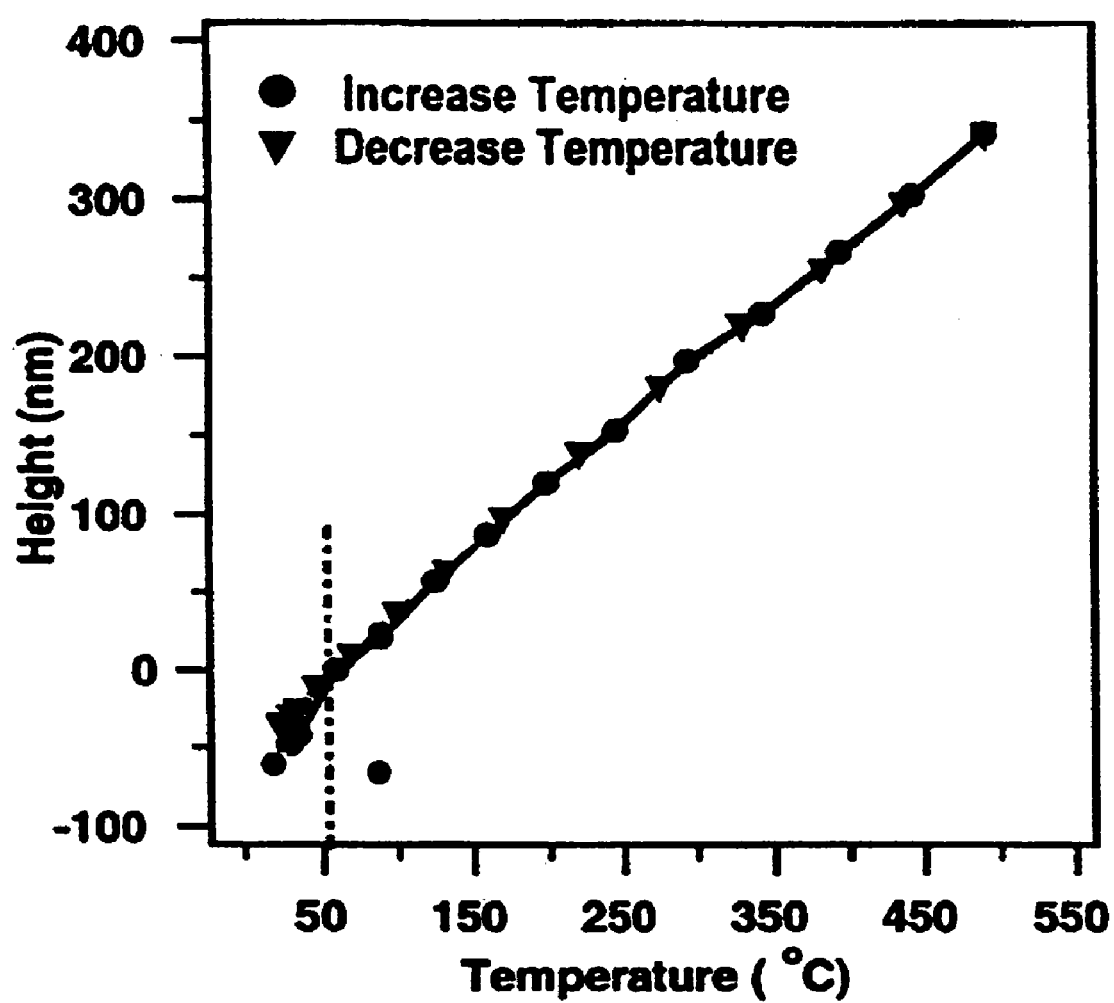
FIG. 3 shows the curves of height of the Ga tip-level vs temperature.

The transmission electron microscope (TEM) specimen of the deposited materials was heated in the microscope using a Gatan heating holder and its twin heating system (Hot Stage Powder Supply, Model 628-0500). The position of the Ga tip-level of the longer columnar Ga vs temperature was investigated in the range 18-500° C. When the temperature increases, the Ga tip-level rises, as shown in FIGS. 2(a), (b), (c) and (d). Conversely, the Ga tip-level goes down when the temperature decreases, as shown in FIGS. 2(e), (f), (g) and (h). The Ga tip-level goes up when the temperature increases, while it goes down when the temperature decreases. The bar in (a) corresponds to 85 nm. If the Ga tip-level at 58° C. is set as the reference zero point, the height of the Ga tip-level vs temperature can be plotted as shown in FIG. 3, where the lines which connect a black circles and a black triangles correspond to the increase process and reduction process of temperature, respectively. Moreover, when the temperature was changed from 20° C. to 500° C., the changes of the complete length and the inner-diameter of the CNT were measured and estimated to be ~−1% due to the very small linear expansion coefficient of graphite (~−1×10$^{-6}$/° C. along a axis in the range of 20-500° C.). Therefore, it is believed that the influence of the expansion of the CNT on the Ga tip-level position can be neglected and the height vs temperature is dominated by the volumetric change of the longer columnar Ga related to the environment temperature.

In general, the volumetric change (expansion or contraction) of a liquid is described by $$v_t = v_0(1 + a\Delta t + b\Delta t^2 + c\Delta t^3) \tag{1}$$

where $v_t$ and $v_0$ are the liquid volumes at temperature t and to, respectively, $\Delta t = t - t_0$, and a, b and c are the coefficient of cubical expansion. A calculation on the slopes of the curves in FIG. 3 and the volume of the longer columnar Ga in FIG. 1(a) shows that the value of coefficient of a Ga is $0.100 \times 10^{-3}/°$ C. at 58° C., which is comparable with the value (=$0.1815 \times 10^{-3}/°$ C., 0-300° C.) of mercury (Hg). The coefficients b and c of Ga can be regarded as zero in the range 50-500° C. FIG. 3 shows that the height of the Ga tip-level is reproducible and linearly changes in the range 50-500° C. However, the characteristic in the range 20-50° C. is complicated and may be related to a liquefaction (or solidification) process when increasing (or decreasing) the temperature. Hence, the CNT filled with a long continuous columnar Ga can be used as a thermometer in the range of at least 50-500° C. For a nano-thermometer, the height of the Ga tip-level is determined by $$\Delta H = (4av_0/\pi d_1^2)\Delta t \qquad (2)$$

where $v_0$ is the volume of a continuous columnar Ga at temperature $t_0$, and $\Delta H$ is the difference between the heights of the Ga tip-level at temperatures t and $t_0$. Conversely, the temperature $t = t_0 + \Delta t$ can be measured after the difference $\Delta H$ is known. To create a sensitive thermometer, the columnar Ga should have a large volume $v_0$ and a small diameter $d_1$. For the nano thermometer of the present invention, the change $\Delta H$ of the Ga tip-level vs temperature is $\Delta H = 0.792$ (t-58), where $\Delta H$ and t are in units nm and ° C., respectively. In theory, if the resolution of a microscope is ~0.2 nm, the accuracy of the temperature measurement can reach ~0.25° C. The nano thermometer of the present invention can be used for the measurement in a micrometer-size environment. Nowadays, many researches have stepped into a size of at least micrometer. Therefore, the four kinds of thermometers designed for a macroscopic environment are no longer appropriate for a micrometer-size environment. The nano thermometer of the present invention could play an important role in various researches involving a temperature measurement of micrometer-size environment. The present kind of nano thermometer filled with Ga has a potential wide measuring range due to the wide liquid range (29.78-2,403° C.) of Ga, which is much wider than that (−38.87-356.58° C.) of Hg.

Generally, there are two approaches to produce CNTs filled with a certain material. The first is to use pre-existing nanotubes and fill them by capillarity, molten media, and wet chemistry solution methods. The second is to produce the nanotubes and their fillings simultaneously. In the present invention, the method for producing the CNTs filled with a long columnar Ga (~7.5 mm) belongs to the second approach. The growth of the Ga filling CNTs may involve two chemical reactions. At a temperature above 966° C., $Ga_2O$ and CO vapours can be generated by the reaction;

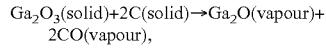

between $Ga_2O_3$ and AAC powder in the graphite crucible. It can be calculated that the change of volume Gibbs energy is −140 kJ for the formation of 1 mol of $Ga_2O$ vapour at 1,360° C. If high surface Gibbs energy of AAC powder is considered, the reaction is more likely to occur. When the $Ga_2O$ and CO vapours reach the low temperature zone (~800° C.) of the top outlet graphite pipe, a vapour-vapour (VV) reaction occurs as;

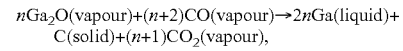

leading to the formation of Ga and C. After knowing the outer diameter $d_0$ and inner diameter $d_1$ of a Ga filling CNT, we can estimate the value of n as follows, $$n = (m_c \rho_{Ga} d_1^2)/[2 m_{Ga} \rho c (d_0^2 - d_1^2)] \qquad (3)$$

where $m_c = 12$ g/mol, $\rho_{Ga} = 6.095$ g/cm$^3$, $m_{Ga} = 69.72$ g/mol and $\rho_c \sim 2.00$ g/cm$^3$. For the Ga filling CNT in FIG. 1(a), n is estimated to be ~1. A series of calculations on the change of Gibbs energy for the VV reaction at n~1 illustrate that it can occur only at a temperature below 835° C., which is consistent with our experiment that the Ga filling CNTs were obtained in the low temperature zone (~800° C.).

INDUSTRIAL APPLICABILITY

As explained in detail above, the present invention provides a novel nano thermometer, which can be used for temperature measurement of a wide temperature range, in a micrometer size environment, and a method for producing the same.

The invention claimed is:

1. A method for producing a nano thermometer, said method comprising mixing $Ga_2O_3$ powder and carbon powder uniformly, performing heat treatment for this mixed powder at a temperature of 966° C. or more under an inert gas flow to vaporize the mixed powder, and reacting the resultant vapors at a temperature of 835° C. or less.

2. A method for producing a nano thermometer according to claim 1, wherein a weight ratio of $Ga_2O_3$ powder to carbon powder is 7:1 to 8:1.

3. A method for producing a nano thermometer according to claim 1, wherein the carbon powder is an amorphous active carbon.

4. A method for producing a nano thermometer according to claim 1, wherein the inert gas is nitrogen gas.

5. A method for producing a nano thermometer according to claim 1, wherein the heat treatment is performed using a vertical radio-frequency furnace.

6. A method for producing a nano thermometer according to claim 1, wherein the heat treatment is performed for 1 hour or more at a temperature of 1200 to 1400° C.

* * * * *